(12) United States Patent
Kim et al.

(10) Patent No.: US 12,016,102 B2
(45) Date of Patent: Jun. 18, 2024

(54) INDUCTION HEATING DEVICE CAPABLE OF REDUCING INTERFERENCE NOISE

(71) Applicant: LG ELECTRONICS INC., Seoul (KR)

(72) Inventors: Hanna Kim, Seoul (KR); Kyelyong Kang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 758 days.

(21) Appl. No.: 16/533,460

(22) Filed: Aug. 6, 2019

(65) Prior Publication Data

US 2020/0053838 A1    Feb. 13, 2020

(30) Foreign Application Priority Data

Aug. 9, 2018   (KR) .................. 10-2018-0093169

(51) Int. Cl.
*H05B 6/06* (2006.01)
*H05B 6/12* (2006.01)
*H05B 6/44* (2006.01)

(52) U.S. Cl.
CPC ........... *H05B 6/065* (2013.01); *H05B 6/1209* (2013.01); *H05B 6/44* (2013.01)

(58) Field of Classification Search
CPC .......... H05B 6/00; H05B 6/06; H05B 6/1272; H05B 6/1209; H05B 6/1218; H05B 6/1239; H05B 6/36; H05B 2206/00; H05B 2206/02; H05B 6/065; H05B 6/44
See application file for complete search history.

(56) References Cited

U.S. PATENT DOCUMENTS

| | | | |
|---|---|---|---|
| 10,455,647 B2 * | 10/2019 | Yun | H05B 6/1272 |
| 11,006,486 B2 * | 5/2021 | Yun | H05B 6/065 |
| 2005/0109770 A1 | 5/2005 | Esteras Duce et al. | |

(Continued)

FOREIGN PATENT DOCUMENTS

| | | | |
|---|---|---|---|
| EP | 1868417 A1 * | 12/2007 | H05B 6/04 |
| EP | 3 026 982 | 6/2016 | |
| JP | 2006004846 A * | 1/2006 | |

(Continued)

OTHER PUBLICATIONS

Do, "Induction Heating Cooker," Oct. 2021 (Year: 2015).*

(Continued)

*Primary Examiner* — Janie M Loeppke
*Assistant Examiner* — Abigail H Rhue
(74) *Attorney, Agent, or Firm* — KED & ASSOCIATES, LLP (57) ABSTRACT

Disclosed herein is an induction heating device capable of reducing interference noise. The induction heating device includes a first power module supplying power for driving to at least one of a first working coil and an inner coil, a second power module supplying power for driving to at least one of a second working coil and an outer coil, and a control unit controlling supply of power by the first power module and the second power module. In an embodiment, the control unit may cut off supply of power to the outer coil when an instruction for heating to at least one of a first heating area and a second heating area, and an instruction for heating to a third heating area are input.

19 Claims, 7 Drawing Sheets

(56) References Cited

U.S. PATENT DOCUMENTS

2009/0139980 A1    6/2009  Acero Acero et al.
2016/0150597 A1    5/2016  Yun et al.

FOREIGN PATENT DOCUMENTS

| JP | 4915271 B2 * | 4/2012 | ........... H05B 6/1272 |
| JP | 2914059 A1 * | 9/2015 | ............. H05B 6/065 |
| KR | 10-1735754 | 5/2017 | |
| KR | 20170075913 A * | 7/2017 | |
| KR | 20200007138 A * | 1/2020 | ............. H05B 6/062 |
| WO | WO 2015/043650 | 4/2015 | |

OTHER PUBLICATIONS

Byeon, "Induction Heater and Control Method of the Induction Heater," Oct. 2021 (Year: 2018).*
Machine translation of JP2006004846A Isogai, Induction Heating Cooker, 2006 (Year: 2006).*
Machine translation of JP4915271: Goto, Heating Cooker, 2007 (Year: 2007).*
Machine translation of EP-1868417: Gouardo, Induction system, method for powering an inductor and cooktop comprising same, 2007 (Year: 2007).*
European Search Report dated Dec. 19, 2019 issued in EP Application No. 19190912.6.

* cited by examiner

INDUCTION HEATING DEVICE CAPABLE OF REDUCING INTERFERENCE NOISE

CROSS-REFERENCE TO RELATED APPLICATION

This application claims priority under 35 U.S.C. § 119 to Korean Application No. 10-2018-0093169 filed on Aug. 9, 2018, whose entire disclosure is hereby incorporated by reference.

BACKGROUND

1. Field

The present disclosure relates to an induction heating device and more specifically, to an induction heating device capable of reducing interference noise.

2. Background

Various types of cooking apparatuses are used to heat food at homes and restaurants. Conventionally, gas stoves that are fueled by gas have been widely used. However, in recent years, apparatuses for heating a container such as a cooking container, e.g., a pot, using electricity instead of gas, have been used.

Processes for heating a container using electricity are broadly classified as resistance heating and induction heating. Resistance heating is a process in which a container is heated by delivering heat, which is generated when electric current flows in a metallic resistance wire or a non-metallic heating element such as silicon carbide, to the container through radiation or conduction, and induction heating is a process in which a container itself is heated by generating eddy currents in the container which consists of a metallic ingredient, using a magnetic field which is generated around a working coil when a predetermined magnitude of high-frequency electric power is supplied to the working coil.

The theory of induction heating is specifically described as follows. When an electric power source is supplied to an induction heating device, a predetermined magnitude of high-frequency voltage is supplied to a working coil. Accordingly, an induction magnetic field is generated around the working coil that is placed in the induction heating device. When a magnetic line of force of the induction magnetic field that is generated as described above passes through the bottom of a container, which includes a metallic ingredient and is placed on the induction heating device, eddy currents are generated inside the bottom of the container. Then the generated eddy currents flow through the bottom of the container, and the container itself is heated.

Induction heating devices that have been widely used in recent years include two or more heating areas and two or more working coils corresponding to said two or more heating areas. For example, when a user puts containers in each of the two heating areas of the induction heating device having two heating areas and cooks food in the heating areas at the same time, power for driving is supplied to each of the two working coils, and accordingly, resonance frequencies are generated in each coil.

When an absolute value of a difference value in the resonance frequencies of the working coils is include in a range of audio frequencies of 2 k to 20 kHZ, interference noise is generated due to drive of the working coils. The interference noise may cause inconvenience to the user, and may lead the user to think that the induction heating device is not working correctly.

Accordingly, various methods for reducing interference noise of induction heating devices having two or more working coils have been suggested. One of the ways of reducing interference noise is to adjust output of each of the heating areas through control of the operation of a power module for supplying power to working coils, or to adjust operating frequencies of each working coil.

For example, Korean Patent No. 10-1735754 discloses that interference noise is prevented by consecutively turning on/off a switching device connected with each induction coil using time division in an induction heating device including a plurality of working coils even though the plurality of working coils operate simultaneously.

However, a prior art, in which thermal power of each heating area is adjusted through control of the operation of a power module, or in which interference noise is reduced by adjusting operating frequencies of each working coil, may not be applied to an induction heating device having three or more heating areas and working coils. Additionally, if the thermal power or the operating frequency is arbitrarily adjusted as in the prior art, it is difficult to provide the output required by the user when the user gives an instruction for heating to each heating area.

Another way of reducing interference noise of induction heating devices having two or more working coils is to maintain a distance between the working coils as long as possible. That is, a distance between working coils increases to a certain degree or above, interference noise is reduced regardless of the magnitude of resonance frequencies. However, when a distance between working coils increase, the volume and size of an induction heating device also increase. Thus, there is a limitation in increasing a distance between working coils in order to reduce interference noise.

The above reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

The various objectives, features and advantages are specifically described hereunder with reference to the attached drawings. Accordingly, one having ordinary skill in the art may readily implement the technical spirit of the present disclosure. Further, in describing the present disclosure, publicly-known technologies in relation to the disclosure are not specifically described if they are deemed to make the gist of the disclosure unnecessarily vague. Below, embodiments are specifically described with reference to the attached drawings. In the drawings, identical reference numerals denote identical or similar elements.

Figure 1:
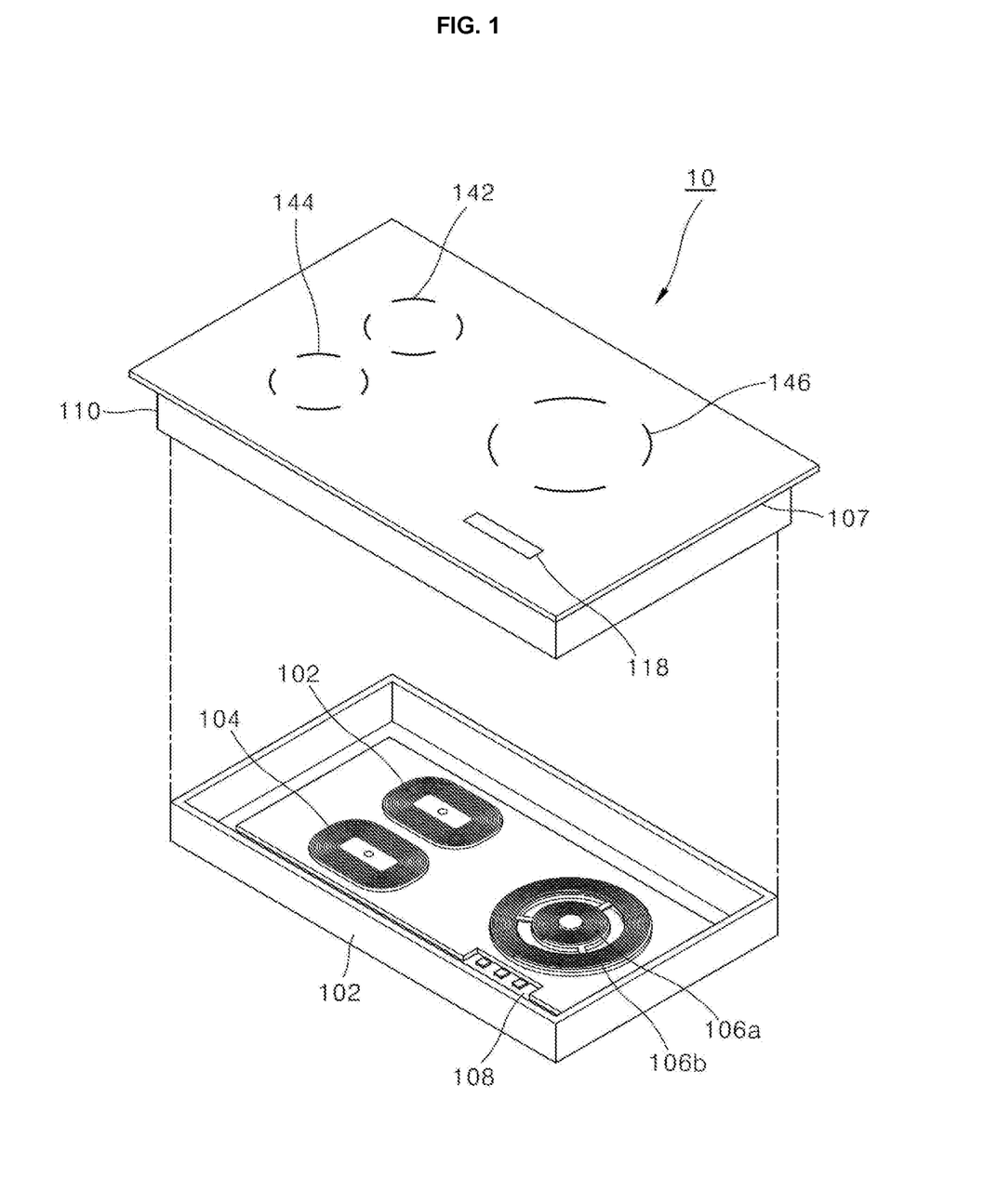
FIG. 1 is a perspective view illustrating an induction heating device according to an embodiment.

FIG. 1 is a perspective view illustrating an induction heating device according to an embodiment. Referring to FIG. 1, an induction heating device 10 according to an embodiment includes a case 102 constituting a main body, and a cover plate 110 coupled to the case 102 and sealing the case 102.

The lower surface of the cover plate 110 is coupled to the upper surface of the case 102 and seals a space formed inside the case 102 from the outside. An upper plate 107 on which an object subject to heating, i.e., a container for cooking food, may be placed is formed on the upper surface of the cover plate 110. The upper plate 107 may be comprised of various materials, for example, tempered glass such as ceramic glass.

Working coils 102, 104, 106a, 106b for heating a container are disposed in the inner space of the case 102, which is formed by coupling the cover plate 110 and the case 102. Specifically, a first working coil 102, a second working coil 104, and a third working coil 106a, 106b are disposed inside the case 102. FIG. 1 illustrates the first working coil 102 and the second working coil 104 that have the shape of a rectangle with edges each of which is curved, and the third working coil 106a, 106b has the shape of a circle. However, the shape of each working coil may vary depending on embodiments.

In an embodiment, the third working coil 106a, 106b may include two coils, i.e., an inner coil 106a and an outer coil 106b. FIG. 1 illustrates a third working coil that is comprised of two working coils, as an example. However, the number of coils that constitute the third working coil, and the number of coils that constitute the inner coil and the outer coil may vary depending on embodiments. For example, the third working coil may be comprised of four working coils. In this case, two coils disposed inside the third working coil may be defined as an inner coil, and the two coils disposed outside the third working coil may be defined as an outer coil. As another example, three coils disposed inside the third working coil may be defined as an inner coil, and the one coil disposed outside the third working coil may be defined as an outer coil.

Additionally, a first heating area 142, a second heating area 144, and a third heating area 146 are displayed on the surface of the upper plate 107 of the cover plate 110 in positions respectively corresponding to those of the first working coil 102, the second working coil 104, and the third working coil 106a, 106b, such that positions of containers are matched with the positions of the working coils 102, 104, 106a, 106b when a user mounts the containers onto the cover plate 110.

Further, the inner space of the case 102 is provided with an interface unit (or user interface device) 108 that allows a user to supply power, that allows a user to adjust output of the working coils 102, 104, 106a, 106b and that displays information concerning the induction heating device 10. Hereinafter, the present disclosure is described in relation to an embodiment in which the interface unit 108 is implemented as a touch panel that may input information and display information by a touch. However, the interface unit 108 may be implemented as another shape or another structure.

An operation area 118 is formed on the upper plate 107 of the cover plate 110 in a position corresponding to the interface unit 108. Specific characters, images, and the like for the operation by a user or for the display of information may be displayed in the operation area 118. The user operates (e.g., touches) a specific point of the operation area 118 referring to the characters or images displayed on the operation area 118 to perform desired operations. Additionally, various sorts of information output by the interface unit 108 may be displayed through the operation area 118 on the basis of operation by the user, or operation of the induction heating device 10.

Further, a power module (not shown) for supplying power to the working coils 102, 104, 106a, 106b or the interface unit 108 is disposed in the inner space of the case 102. The power module is electrically connected with the working coils 102, 104, 106a, 106b or the interface unit 108, converts the power supplied by an external power source into power appropriate for driving the working coils 102, 104, 106a, 106b or the interface unit 108, and supplies the converted power to the working coils 102, 104, 106a, 106b or the interface unit 108.

FIG. 1 illustrates three working coils 102, 104, 106a, 106b disposed in the inner space of the case 102, as an example. However, according to embodiments, a single working coil may be disposed in the inner space of the case 102, or four or more working coils may be disposed in the inner space of the case 102.

Although not shown in FIG. 1, a control unit (not shown), otherwise referred to as a controller or control circuitry, may be disposed in the inner space of the case 102. The control unit (not shown) controls the supply of power to the working coils 102, 104, 106a, 106b by the drive of the power module based on instructions of a user (instructions for heating, stopping heating, adjusting thermal power and the like), which are input through the interface unit 108.

Figure 2:
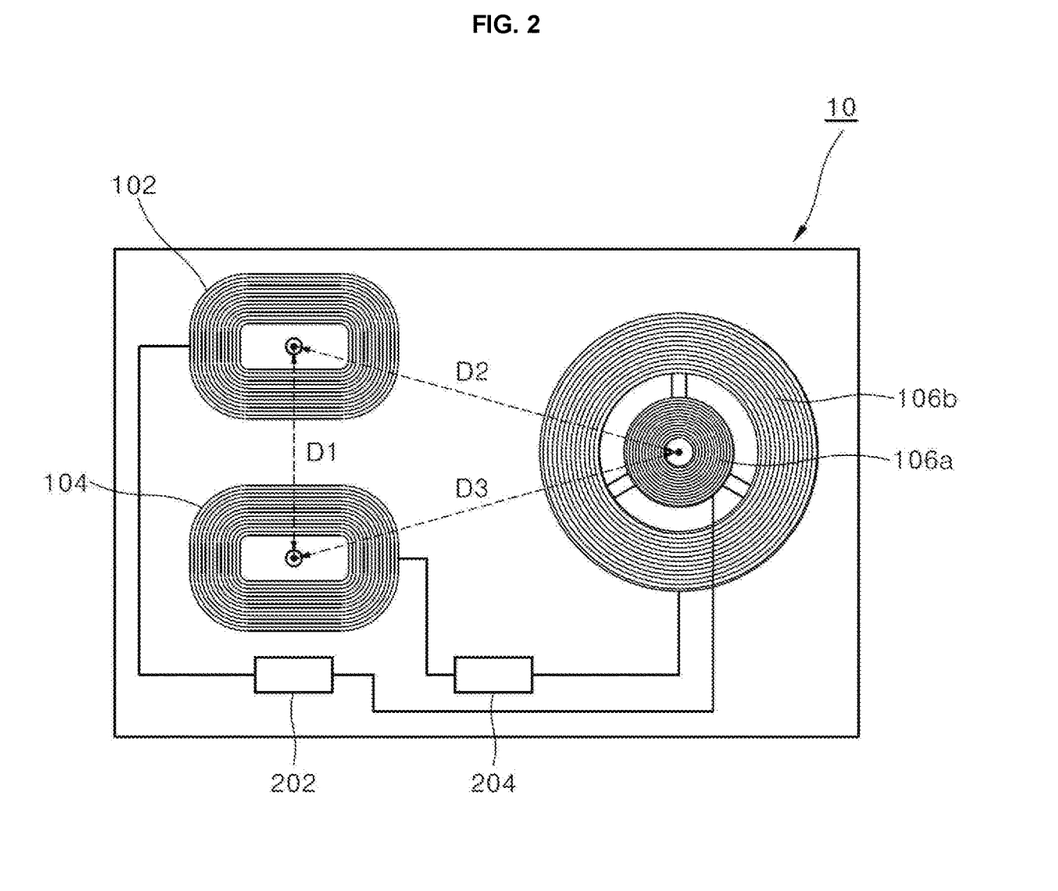
FIG. 2 is a plan view illustrating an arrangement of a working coil included in an induction heating device according to an embodiment.

FIG. 2 is a plan view illustrating an arrangement of a working coil included in an induction heating device according to an embodiment. Referring to FIG. 2, the induction heating device 10 according to an embodiment includes a first working coil 102, a second working coil 104, and a third working coil 106a, 106b.

As illustrated in FIG. 2, the central point of the first working coil 102 and the central point of the second working coil 104 may be placed on the same straight line. The central point of the third working coil 106a, 106b may be placed on a straight line perpendicular to the straight line that connects the central point of the first working coil 102 and the central point of the second working coil 104. Accordingly, the third working coil 106a, 106b may be disposed on the right-side surface or the left-side surface with respect to the straight line that connects the central point of the first working coil 102 and the central point of the second working coil 104.

Additionally, coils that constitute the third working coil 106a, 106b, i.e., the inner coil 106a and the outer coil 106b, are disposed to share the central point. In other words, the central point of the inner coil 106a and the central point of the outer coil 106b coincide with each other.

In an embodiment, a distance D2 between the central point of the first working coil 102 and the central point of the third working coil (inner coil 106a or outer coil 106b) may be the same as a distance D3 between the central point of the second working coil 104 and the central point of the third working coil (inner coil 106a or outer coil 106b).

Additionally, in an embodiment, a distance D1 between the central point of the first working coil 102 and the central point of the second working coil 104 may be shorter than the distance D2 between the central point of the first working coil 102 and the central point of the third working coil (inner coil 106a or outer coil 106b), or the distance D3 between the central point of the second working coil 104 and the central point of the third working coil (inner coil 106a or outer coil 106b).

Referring back to FIG. 2, the induction heating device 10 according to an embodiment includes a first power module (or first power circuitry) 202 and a second power module (or first power circuitry) 204 that supply power for driving the first working coil 102, the second working coil 104 and the third working coil 106a, 106b. As illustrated in FIG. 2, the first power module 202 is electrically connected with the first working coil 102 and the inner coil 106a. Accordingly, the first power module 202 supplies power for driving to at least one of the first working coil 102 or the inner coil 106a. Additionally, the second power module 204 is electrically connected with the second working coil 104 and the outer coil 106b. Accordingly, the second power module 204 supplies power for driving to at least one of the second working coil 104 or the outer coil 106b.

Figure 3:
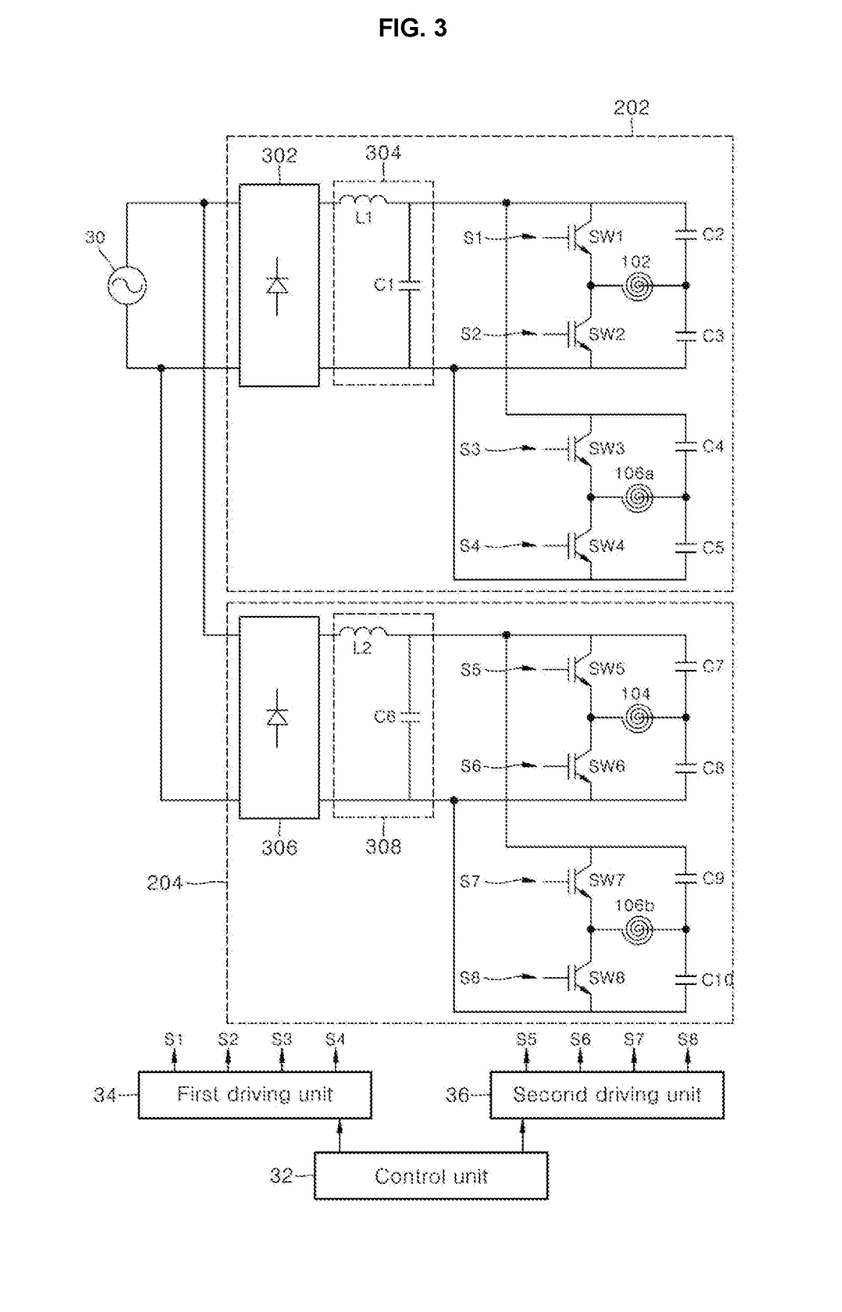
FIG. 3 is a circuit diagram of a working coil and power module of an induction heating device according to an embodiment.

FIG. 3 is a circuit diagram of a working coil and power module of an induction heating device according to an embodiment. Referring to FIG. 3, the induction heating device according to an embodiment includes two power modules, i.e., a first power module 202 and a second power module 204. The first power module 202 and the second power module 204 convert alternating current power supplied by an external power source 30 into power for driving, and supply the power for driving to the first working coil 102, the second working coil 104, and the third working coil 106a, 106b respectively.

In the present disclosure, the first power module 202 and the second power module 204 operate independently. The first power module 202, as described above, is electrically connected with the first working coil 102 and the inner coil 106a, and supplies power for driving to at least one of the first working coil 102 and the inner coil 106a. Additionally, the second power module 204 is electrically connected with the second working coil 104 and the outer coil 106b, and supplies power for driving to at least one of the second working coil 104 and the outer coil 106b.

The first power module 202 includes a rectifying unit (or first rectifying circuit) 302 and a smoothing unit (or first smoothing circuit or LC filter) 304. The rectifying unit 302 rectifies and outputs alternating current power supplied by an external power source 30. The smoothing unit 304 includes a first inductor (L1) and a first capacitor (C1), and converts power output by the rectifying unit 302 into direct current power and outputs the direct current power. Additionally, the first power module 202 includes a plurality of switching devices, or switches, (SW1, SW2, SW3, and SW4) and a plurality of capacitors (C2, C3, C4, and C5).

A first switching device (SW1) and a second switching device (SW2) are connected in series with each other, and repeat turning on and off by a first switching signal (S1) and a second switching signal (S2) output from a first driving unit 34. The operations of turning on and turning off the switching devices may be referred to as "switching operation".

A second capacitor (C2) and a third capacitor (C3) are connected in series with each other. The first switching device (SW1) and the second switching device (SW2), and the second capacitor (C2) and the third capacitor (C3) are connected in parallel with each other.

The first working coil 102 is connected between a connection point between the first switching device (SW1) and the second switching device (SW2), and a connection point between the second capacitor (C2) and the third capacitor (C3). When the first switching signal (S1) and the second switching signal (S2) are respectively supplied to the first switching device (SW1) and the second switching device (SW2), and the first switching device (SW1) and the second switching device (SW2) perform a switching operation, alternating current power is supplied to the first working coil 102, and induction heating is performed.

Similarly, the inner coil 106a is connected between a connection point between a third switching device (SW3) and a fourth switching device (SW4), and a connection point between a fourth capacitor (C4) and a fifth capacitor (C5). When a third switching signal (S3) and a fourth switching signal (S4) are respectively supplied to the third switching device (SW3) and the fourth switching device (SW4), and the third switching device (SW3) and the fourth switching device (SW4) perform a switching operation, alternating current power is supplied to the inner coil 106a, and induction heating is performed.

The first driving unit 34 supplies the first switching signal (S1), the second switching signal (S2), the third switching signal (S3), and the fourth switching signal (S4) respectively to the first switching device (SW1), the second switching device (SW2), the third switching device (SW3), and the fourth switching device (SW4) that are included in the first power module 202.

A control unit (or controller) 32 supplies control signals to the first driving unit 34 and controls output of switching signals (S1, S2, S3, and S4) by the first driving unit 34. For example, the control unit 32 may control the first driving unit 34 such that the first driving unit 34 supplies only the first switching signal (S1) and the second switching signal (S2), and may supply power only to the first working coil 102, or may control the first driving unit 34 such that the first driving unit 34 supplies only the third switching signal (S3) and the fourth switching signal (S4), and may supply power only to the inner coil 106a. Additionally, the control unit 32 may control the first driving unit 34 such that the first driving unit 34 supplies all the first switching signal (S1), the second switching signal (S2), the third switching signal (S3), and the fourth switching signal (S4), so that power may be supplied to all the first working coil 102 and the inner coil 106a.

Further, the control unit 32 may adjust switching frequencies, i.e., operating frequencies, of the first switching signal (S1), the second switching signal (S2), the third switching signal (S3), and the fourth switching signal (S4) supplied by the first driving unit 34. An amount of power, supplied to the first working coil 102 or the inner coil 106a, differs on the basis of the adjustment of the operating frequencies by the control unit 32. Accordingly, when the first working coil 102 or the inner coil 106a is driven, resonance frequencies, and amounts of output of the first working coil 102 or the inner coil 106a differ.

The second power module 204 has a configuration similar to that of the first power module 202. The second power module 204 includes a rectifying unit (or second rectifying circuit) 306 and a smoothing unit (or second smoothing circuit or LC filter) 308. The rectifying unit 306 rectifies and outputs alternating current power supplied by an external power source 30. The smoothing unit 308 includes a second inductor (L2) and a sixth capacitor (C6), and converts power output by the rectifying unit 306 into direct current power and outputs the direct current power.

Additionally, the second power module 204 includes a plurality of switching devices (SW5, SW6, SW7, and SW8), and a plurality of capacitors (C7, C8, C9, and C10). The plurality of switching devices (SW5, SW6, SW7, and SW8), and the plurality of capacitors (C7, C8, C9, and C10) that are included in the second power module 204 have the same configuration as the plurality of switching devices (SW1, SW2, SW3, and SW4) and the plurality of capacitors (C2, C3, C4, and C5) that are included in the first power module 202.

The second working coil 104 is connected between a connection point between a fifth switching device (SW5) and a sixth switching device (SW6), and a connection point between a seventh capacitor (C7) and an eight capacitor (C8). When a fifth switching signal (S5) and a sixth switching signal (S6) are respectively supplied to the fifth switching device (SW5) and the sixth switching device (SW6), and the fifth switching device (SW5) and the sixth switching device (SW6) perform a switching operation, alternating current power is supplied to the second working coil 104, and induction heating is performed.

Similarly, the outer coil 106b is connected between a connection point between a seventh switching device (SW7) and an eighth switching device (SW8), and a connection point between a ninth capacitor (C9) and a tenth capacitor (C10). When a seventh switching signal (S7) and an eighth switching signal (S8) are respectively supplied to the seventh switching device (SW7) and the eighth switching device (SW8), and the seventh switching device (SW7) and the eighth switching device (SW8) perform a switching operation, alternating current power is supplied to the outer coil 106b, and induction heating is performed.

A second driving unit 36 supplies the fifth switching signal (S5), the sixth switching signal (S6), the seventh switching signal (S7), and the eighth switching signal (S8) respectively to the fifth switching device (SW5), the sixth switching device (SW6), the seventh switching device (SW7), and the eighth switching device (SW8) that are included in the second power module 204.

The control unit 32 supplies control signals to the second driving unit 36 and controls output of switching signals (S5, S6, S7, S8) by the second driving unit 36. For example, the control unit 32 may control the second driving unit 36 such that the second driving unit 36 supplies only the fifth switching signal (S5) and the sixth switching signal (S6), and may supply power only to the second working coil 104, or may control the second driving unit 36 such that the second driving unit 36 supplies only the seventh switching signal (S7) and the eighth switching signal (S8), and may supply power only to the outer coil 106b. Additionally, the control unit 32 may control the second driving unit 36 such that the second driving unit 36 supplies all the fifth switching signal (S5), the sixth switching signal (S6), the seventh switching signal (S7), and the eighth switching signal (S8), and may supply power to all the second working coil 104 and the outer coil 106b.

Further, the control unit 32 may adjust switching frequencies, i.e., operating frequencies, of the fifth switching signal (S5), the sixth switching signal (S6), the seventh switching signal (S7), and the eighth switching signal (S8) supplied by the second driving unit 36. An amount of electricity, supplied to the second working coil 104 or the outer coil 106b, differs on the basis of the adjustment of the operating frequencies by the control unit 32. Accordingly, when the second working coil 104 or the outer coil 106b is driven, resonance frequencies, and amounts of output of the second working coil 104 or the outer coil 106b differ.

Figure 4:
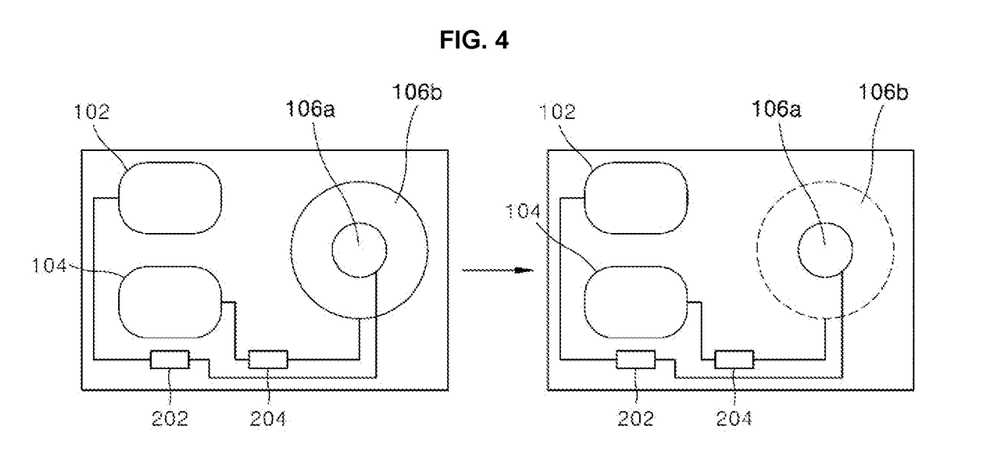
FIGS. 4 to 6 illustrate a state in which a working coil is driven based on control exerted by a control unit according to an embodiment.
Figure 5:
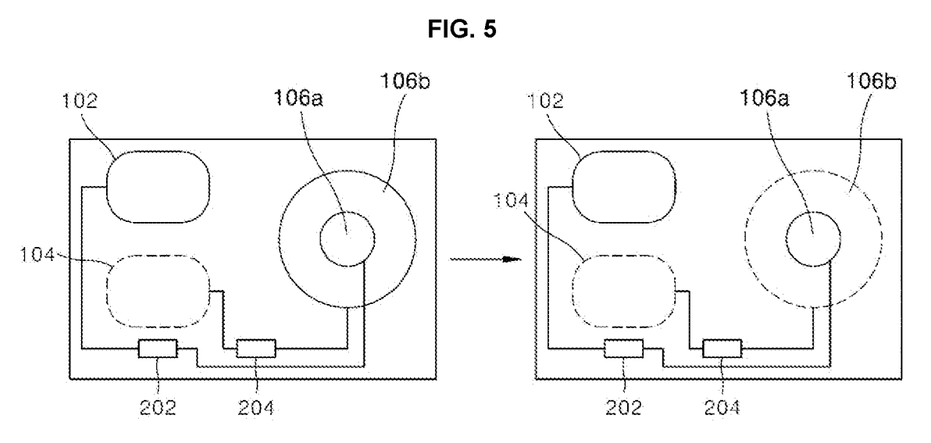
Figure 6:
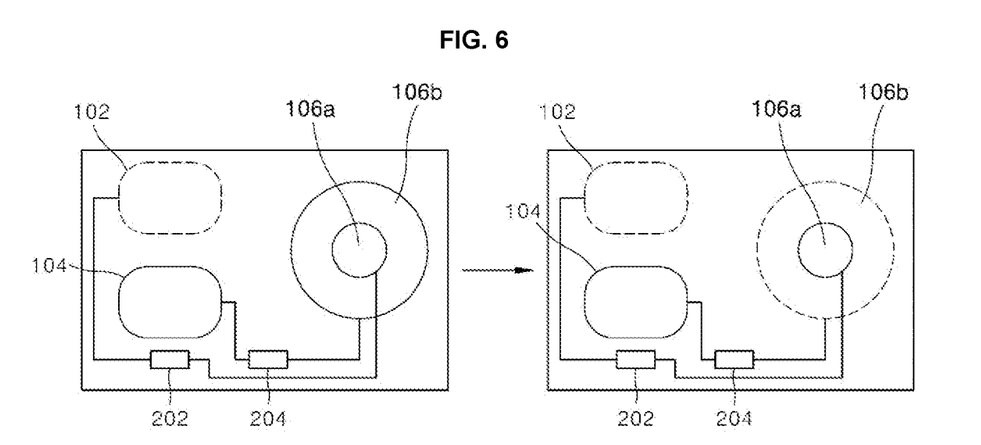

FIGS. 4 to 6 illustrate states in which one or more working coils are selectively driven based on control exerted by a control unit according to an embodiment. When a user desires to use the induction heating device 10 according to the present disclosure, the user selects a heating area subject to heating through the interface unit 118, or puts a container in a heating area subject to heating. Then the user sets thermal power for heating the container through the selected heating area. When the user starts to heat the container after setting the thermal power, an instruction for heating is delivered to the control unit 32 through the interface unit 118.

When the instruction for heating is input, the control unit 32 of the induction heating device 10 according to an embodiment confirms a heating area to which the instruction for heating is input, and determines whether to cut off supply of power to each working coil on the basis of the sort of the heating area to which the instruction for heating is input.

When a user selects any one of the first heating area 142, the second heating area 144 and the third heating area 146, and inputs an instruction for heating, the control unit 32 supplies control signals to the first driving unit 34 or the second driving unit 36 such that electricity may be supplied to a working coil corresponding to the heating area selected by the user on the basis of the instruction for heating. However, when a user selects two or more heating areas including the third heating area 146 and inputs an instruction for heating, the control unit 32 may cut off supply of electricity to some working coils, based on the sort of the heating area selected by the user.

In the embodiment of FIG. 4, the user selects all the first heating area 142, the second heating area 144, and the third heating area 146, and inputs an instruction for heating to each of the heating areas. The control unit 32 confirms that the instruction for heating is input to all the three heating areas, and then confirms a maximum amount of power, i.e., a maximum output that may be output by a working coil corresponding to each of the heating areas when the working coil performs the operation of induction heating.

Hereinafter, provided is an example in the case in which a maximum amount of electricity that may be supplied to the first working coil 102 and the inner coil 106a by the first power module 202 is 3.6 kW, and a maximum amount of electricity that may be supplied to the second working coil 104 and the outer coil 106b by the second power module 204 is 3.6 kW. However, the maximum output of each of the power modules is not limited. According to embodiments, the maximum output of each of the power modules may be set differently.

The control unit 32 may compare a maximum output of each of the working coils, and an amount of power corresponding to thermal power for each of the heating areas, which is set by a user, i.e., requested output. In an embodiment, the control unit 32 compares the requested output of the third heating area 146, which is set by the user, with the maximum output of the inner coil 106a.

The maximum output of the inner coil 106a is determined by a maximum amount of power (e.g., 3.6 kW) that may be supplied by the first power module 202, and an amount of power that is supplied to the first working coil 102. For example, if the first power module 202 is supplying power of 1.0 kW to the first working coil 102 at the request of the user, a maximum output of the inner coil 106a is determined to be 2.6 kW, in which 1.0 kW is deducted from 3.6 KW.

When requested output (e.g., 1.3 kW) of the third heating area 146, which is set by the user, is less than or equal to the maximum output (e.g., 2.6 kW) of the inner coil 106a as a result of comparison, the control unit 32, as illustrated in FIG. 4, cuts off the supply of power to the outer coil 106b and controls the outer coil 106b such that the outer coil 106b is not driven. In FIG. 4, the dotted line denotes that supply of power to the coil is cut off and the coil is not operating, and the solid line denotes that power is supplied to the coil and the coil is operating.

However, when requested output (e.g., 5.0 kW) of the third heating area 146, which is set by the user, exceeds the maximum output (e.g., 2.6 kW) of the inner coil 106a, the control unit 32 controls the second power module 204 to allow of supply of power to the outer coil 106b. Accordingly, output may be supplied at a level required by the user, using the inner coil 106a and the outer coil 106b.

In another embodiment, when a user selects all the first heating area 142, the second heating area 144, and the third heating area 146, and inputs an instruction for heating to each of the heating areas, the control unit 32 may also cut off supply of power to the outer coil 106b all the time without comparing requested output of the third heating area 146, which is set by the user, and a maximum output of the inner coil 106a.

As in FIG. 4, when the control unit 32 limits drive of the outer coil 106b, power is supplied only to the inner coil 106a by the first power module 202 in the third heating area 146, and the inner coil 106a is only driven. Additionally, power is supplied by the first power module 202 to the first working coil 102 corresponding to the first heating area to which the user inputs the instruction for heating, and power is supplied by the second power module 204 to the second working coil 104 corresponding to the second heating area to which the user inputs the instruction for heating.

When the drive of the outer coil 106b is limited, and the inner coil 106a, the first working coil 102 and the second working coil 104 operate at the same time, a distance between the first working coil 102 and the second working coil 104, and the third working coil may be kept at a maximum because a diameter of the outer coil 106b is greater than that of the inner coil 106a. As described above, when a physical distance between the working coils becomes longer, interference noise that is generated when the working coils are being driven may be reduced. Accordingly, interference noise generated between the first working coil 102 and the third working coil, and interference noise generated between the second working coil 104 and the third working coil may be reduced to a minimum level.

As in FIG. 4, when the inner coil 106a, the first working coil 102 and the second working coil 104 operate at the same time, the control unit 32 may control the first working coil 102 and the second working coil 104 such that an absolute value of a difference value between a resonance frequency of the first working coil 102 and a resonance frequency of the second working coil 104 is out of a preset reference range (e.g., audio frequency range). To this end, the control unit 32 may set an operating frequency of the first power module 202 and an operating frequency of the second power module 204 differently, or may adjust output of each coil temporarily. Accordingly, interference noise generated between the first working coil 102 and the second working coil 104 may also be reduced.

Next, as in the embodiment of FIG. 5, when a user inputs an instruction for heating to the first heating area 142 and the third heating area 146, the control unit 32 compares requested output of the third heating area 146, which is set by the user, with a maximum output of the inner coil 106a. When the requested output of the third heating area 146, which is set by the user, is less than or equal to the maximum output of the inner coil 106a as a result of comparison, the control unit 32, as in FIG. 5, cuts off the supply of power to the outer coil 106b and controls the outer coil 106b such that the outer coil 106b is not driven.

However, when the requested output of the third heating area 146, which is set by the user, exceeds the maximum output of the inner coil 106a, the control unit 32 controls the second power module 204 to allow of supply of power to the outer coil 106b.

In another embodiment, when a user selects all the first heating area 142 and the third heating area 146, and inputs an instruction for heating to each of the heating areas, the control unit 32 may also cut off supply of power to the outer coil 106b all the time without comparing requested output of the third heating area 146, which is set by the user, and a maximum output of the inner coil 106a.

As in FIG. 5, when the control unit 32 limits the drive of the outer coil 106b, power is supplied only to the inner coil 106a by the first power module 202 in the third heating area 146, and the inner coil 106a is only driven. Additionally, power is supplied by the first power module 202 to the first working coil 102 corresponding to the first heating area to which the user inputs the instruction for heating.

When the drive of the outer coil 106b is limited, and the inner coil 106a and the first working coil 102 operate at the same time, a distance between the first working coil 102 and the third working coil may be kept at a maximum. Accordingly, interference noise generated between the first working coil 102 and the third working coil may be reduced to a minimum level.

According to embodiments, the control unit 32 may further control the first working coil 102 and the inner coil 106a such that an absolute value of a difference value between a resonance frequency of the first working coil 102 and a resonance frequency of the inner coil 106a is out of a preset reference range (e.g., audio frequency range). To this end, the control unit 32 may set an operating frequency of the first working coil 102 and an operating frequency of the inner coil 106a differently, or may adjust output of each coil temporarily. Accordingly, interference noise generated between the first working coil 102 and the inner coil 106a may be further reduced.

Next, as in the embodiment of FIG. 6, when a user inputs an instruction for heating to the second heating area 144 and the third heating area 146, the control unit 32 compares requested output of the third heating area 146, which is set by the user, with a maximum output of the inner coil 106a. When the requested output of the third heating area 146, which is set by the user, is less than or equal to the maximum output of the inner coil 106a as a result of comparison, the control unit 32, as illustrated in FIG. 5, cuts off the supply of power to the outer coil 106b and controls the outer coil 106b such that the outer coil 106b is not driven. However, when the requested output of the third heating area 146, which is set by the user, exceeds the maximum output of the inner coil 106a, the control unit 32 controls the second power module 204 to allow of supply of power to the outer coil 106b.

In another embodiment, when a user selects all the second heating area 144 and the third heating area 146 and inputs an instruction for heating to each of the heating areas, the control unit 32 may also cut off supply of power to the outer coil 106b all the time without comparing requested output of the third heating area 146, which is set by the user, and a maximum output of the inner coil 106a.

As in FIG. 6, when the control unit 32 limits the drive of the outer coil 106b, power is supplied only to the inner coil 106a by the first power module 202 in the third heating area 146, and the inner coil 106a is only driven. Additionally, power is supplied by the second power module 204 to the second working coil 104 corresponding to the second heating area to which the user inputs the instruction for heating.

When the drive of the outer coil 106b is limited, and the inner coil 106a and the second working coil 104 operate at the same time, a distance between the second working coil 104 and the third working coil may be kept at a maximum. Accordingly, interference noise generated between the second working coil 104 and the third working coil may be reduced to a minimum level.

According to embodiments, the control unit 32 may further control the second working coil 104 and the inner coil 106a such that an absolute value of a difference value between a resonance frequency of the second working coil 104 and a resonance frequency of the inner coil 106a is out of a preset reference range (e.g., audio frequency range). To this end, the control unit 32 may set an operating frequency of the second working coil 104 and an operating frequency of the inner coil 106a differently, or may adjust output of each coil temporarily. Accordingly, interference noise generated between the second working coil 104 and the inner coil 106a may be further reduced.

As described referring to FIGS. 4 to 6, the control unit 32 of the induction heating device 10 according to the present disclosure may cut off supply of power to the outer coil 106b when an instruction for heating to at least one of the first heating area and the second heating area, and an instruction for heating to the third heating area are input. Accordingly, a distance between the first working coil and the third working coil, or a distance between the second working coil and the third working coil may be kept at a maximum, thereby reducing interference noise.

If the operation of heating of the first heating area and the second heating area is finished in the state in which supply of power to the outer coil 106b is cut off, the control unit 32 allows of supply of power to the outer coil 106b. This is because when the operation of heating of the first heating area and the second heating area is finished, interference noise between the first working coil and the third working coil, or interference noise between the second working coil and the third working coil is no longer generated.

As described above, according to the induction heating device of the present disclosure, supply of power to a specific working coil is cut off under specific conditions, thereby making it possible to lengthen a physical distance between the working coils. Thus, interference noise generated between the working coils may be reduced to a certain level.

Figure 7:
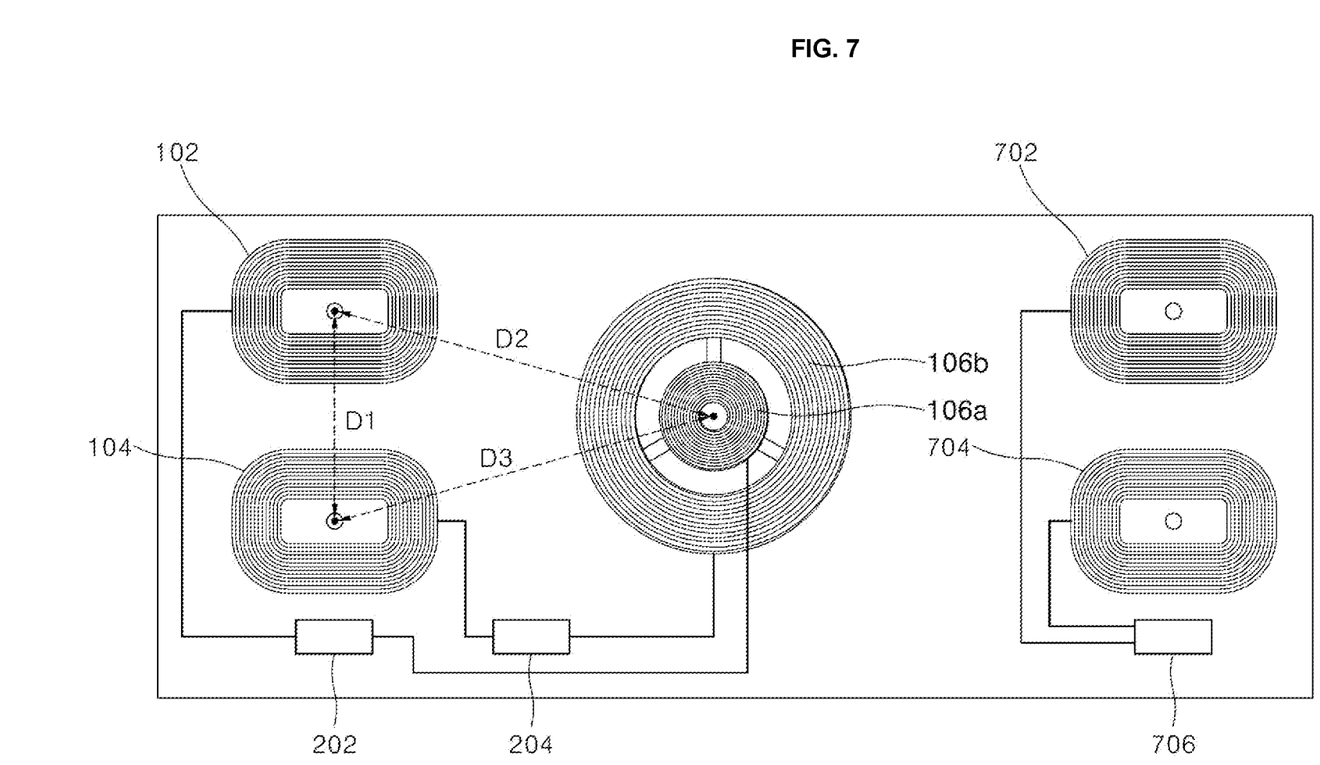
FIG. 7 is a plan view illustrating an arrangement of a working coil included in an induction heating device according to another embodiment.

FIG. 7 is a plan view illustrating an arrangement of a working coil included in an induction heating device according to another embodiment. The induction heating device according to embodiments described above through FIGS. 1 to 6 includes only three working coils. However, the induction heating device of the present disclosure may include a various number of working coils according to embodiments.

For example, the induction heating device of the present disclosure, as illustrated in FIG. 7, may include a total of five working coils, i.e., a first working coil 102, a second working coil 104, a third working coil 106a, 106b, a fourth working coil 702, and a fifth working coil 704. The first working coil 102 and the inner coil 106a of the third working coil are electrically connected with a first power module 202 and receive power from the first power module 202. Additionally, the second working coil 104 and the outer coil 106b of the third working coil are electrically connected with a second power module 204 and receive power from the second power module 204.

The fourth working coil 702 and the fifth working coil 704 are placed respectively in positions corresponding to a fourth heating area (not shown) and a fifth heating area (not shown). The fourth working coil 702 and the fifth working coil 704 are placed to be symmetrical to the first working coil 102 and the second working coil 104 with respect to the third working coil 106a, 106b. The fourth working coil 702 and the fifth working coil 704 are electrically connected with a third power module (or third power circuitry) 706 and receive power from the third power module 706. The third power module 706 may include components that correspond to the components of the first and second power modules 202, 204, such as rectifying unit, a smoothing unit, and various switches and capacitors.

Even in the case in which the induction heating device includes five working coils as in FIG. 7, control may be performed to reduce interference noise with a method similar to the method that is described above through FIGS. 4 to 6. That is, when an instruction for heating to at least one of the first heating area, the second heating area, the fourth heating area and the fifth heating area is input together with an instruction for heating to the third heating area, the control unit 32 may cut off supply of power to the outer coil 106b temporarily and may control the inner coil 106a such that the inner coil 106a is only driven, thereby reducing interference noise between the third working coil and the rest of the working coils.

The present disclosure described above may be replaced, modified and changed in different forms within the technical spirit of the disclosure by one having ordinary skill in the art and thus, should not be limited to the above-described embodiments and the attached drawings.

Aspects of the present disclosure reduce interference noise that is generated when an induction heating device having three or more heating areas and three or more working coils corresponding to the three or more heating areas is driven. Aspects of the present disclosure are not limited to what has been described. Additionally, other aspects that have not been mentioned may be clearly understood from the description and may be more clearly understood from embodiments. Further, it will be understood that the objectives and advantages of the present disclosure may be realized via means and a combination thereof that are described in the appended claims.

An induction heating device according to the present disclosure includes three or more working coils, i.e., a first working coil, a second working coil, and a third working coil, corresponding to three or more heating areas. In an embodiment, the central point of the first working coil, and the central point of the second working coil may be disposed on the same straight line. The central point of the third working coil may be placed on a straight line perpendicular to a straight line that connects the central point of the first working coil, and the central point of the second working coil.

Additionally, in an embodiment, a distance between the central point of the first working coil and the central point of an inner coil, and a distance between the central point of the second working coil and the central point of the inner coil may be the same.

Further, in an embodiment, a distance between the central point of the first working coil, and the central point of the second working coil may be shorter than a distance between the central point of the first working coil and the central point of the inner coil, or a distance between the central point of the second working coil and the central point of the inner coil.

An induction heating device according to the present disclosure includes a first power module that supplies power for driving to at least one of the first working coil and the inner coil, a second power module that supplies power for driving to at least one of the second working coil and an outer coil, and a control unit that controls supply of power by the first power module and the second power module. In an embodiment, the control unit may cut off supply of power to the outer coil when an instruction for heating to at least one of the first heating area and the second heating area, and an instruction for heating to the third heating area are input.

According to the present disclosure, it is possible to reduce interference noise that is generated when an induction heating device having three or more heating areas and three or more working coils corresponding to three or more heating areas is driven.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An induction heating device, comprising:
    a first working coil corresponding to a first heating area;
    a second working coil corresponding to a second heating area;
    a plurality of third working coils corresponding to a third heating area, the third working coils including an inner coil and an outer coil that are concentric to share a central point;
    a first power circuitry to selectively supply power to drive at least one of the first working coil or the inner coil;
    a second power circuitry to selectively supply power to drive at least one of the second working coil or the outer coil; and
    a controller to manage power supplied by the first power circuitry and the second power circuitry,
    wherein, when a user instructs to concurrently activate the third heating area and at least one of the first heating area or the second heating area, the controller:
        manages at least one of the first power circuitry to supply power to the first working coil or the second power circuitry to supply power to the second coil, and
        manages the first power circuitry to continuously supply power to the inner coil and the second power circuitry to not supply power to the outer coil when a requested total output power on the third heating area is more than a maximum output power of the inner coil, in order to reduce noise between the third heating area and the first and second heating areas.

2. The induction heating device of claim 1, wherein a distance between a central point of the first working coil and the central point of the inner coil, and a distance between a central point of the second working coil and the central point of the inner coil are the same.

3. The induction heating device of claim 1, wherein a distance between a central point of the first working coil and a central point of the second working coil is shorter than either of a distance between the central point of the first working coil and the central point of the inner coil and a distance between the central point of the second working coil and the central point of the inner coil.

4. The induction heating device of claim 1, wherein, when the at least one of the first heating area or the second heating area is to be deactivated while the third heating area remains active, the controller:
   manages the at least one of the first power circuitry to stop supplying power to the first working coil or the second power circuitry to stop supplying power to the second coil, and
   manages the second power circuitry to supply power to the outer coil.

5. The induction heating device of claim 4, wherein the controller manages the first power circuitry to supply power to the inner coil and second power circuitry supplies power to the outer coil when the third heating area is active while the first and second heating areas are inactive.

6. The induction heating device of claim 1, wherein the controller is further configured to manage the second power circuitry to not supply power to the outer coil when the requested total output power on the third heating area is less than or equal to the maximum output power of the inner coil.

7. The induction heating device of claim 1, wherein when the user instructs to concurrently activate both the first heating area and the second heating area, the controller manages the first power circuitry and the second power circuitry such that an absolute value of a difference between a resonance frequency of the first working coil and a resonance frequency of the second working coil is outside of a reference range of values.

8. The induction heating device of claim 1, wherein the controller further manages the first power circuitry and the second power circuitry such that an absolute value of a difference between a resonance frequency of an active one of the first working coil or the second working coil and a resonance frequency of the inner coil is outside of a reference range of values.

9. The induction heating device of claim 1, further comprising:
   a fourth working coil corresponding to a fourth heating area; and
   a third power circuitry to selectively supply power to drive the fourth working coil,
   wherein, when the user instructs to concurrently activate the third heating area and the fourth heating area, the controller further:
     manages the third power circuitry to supply power to the fourth coil to activate the fourth heating area, and
     manages the first power circuitry to supply power to the inner coil and the second power circuitry to not supply power to the outer coil to activate the third heating area.

10. The induction heating device of claim 1, wherein the first power circuitry includes:
    a first pair of switches and a first pair of capacitors coupled to the first working coil; and
    a second pair of switches and a second pair of capacitors coupled to the inner coil, and
    wherein the second power circuitry includes:
      a third pair of switches and a third pair of capacitors coupled to the second working coil; and
      a fourth pair of switches and a fourth pair of capacitors coupled to the outer coil.

11. The induction heating device of claim 10, wherein each of the first power circuitry and the second power circuitry further includes:
    a rectifying circuit, and
    a smoothing circuit.

12. The induction heating device of claim 11, wherein the smoothing circuit in one of the first power circuitry or the second power circuitry includes:
    an inductor provided in series with the respective switches and the respective capacitors in the one of the first power circuitry or the second power circuitry; and
    a capacitor provided in parallel to the respective switches and the respective capacitors in the one of the first power circuitry or the second power circuitry.

13. The induction heating device of claim 10, wherein:
    the first pair of switches are provided in series with each other,
    the first pair of capacitors are provided in series with each other and in parallel with the first pair of switches,
    the second pair of switches are provided in series with each other,
    the second pair of capacitors are provided in series with each other and in parallel with the second pair of switches,
    the third pair of switches are provided in series with each other,
    the third pair of capacitors are provided in series with each other and in parallel with the third pair of switches,
    the fourth pair of switches are provided in series with each other,
    the fourth pair of capacitors are provided in series with each other and in parallel with the fourth pair of switches.

14. The induction heating device of claim 10, wherein the controller, when managing power supplied by the first power circuitry and the second power circuitry, is further to provide respective switching signals to selectively activate or deactivate the switches of the first power circuitry and the second power circuitry.

15. An induction heating device, comprising:
    a first working coil corresponding to a first heating area;
    a second working coil corresponding to a second heating area;
    a plurality of third working coils corresponding to a third heating area, the third working coils including an inner coil and an outer coil that are concentric to share a central point;
    a first power circuitry to selectively supply power to drive at least one of the first working coil or the inner coil;
    a second power circuitry to selectively supply power to drive at least one of the second working coil or the outer coil; and
    a controller to manage power supplied by the first power circuitry and the second power circuitry,
    wherein, when a user instructs to activate the third heating area, the controller:
      manages the first power circuitry to continuously supply power to the inner coil and the second power circuitry to not supply power to the outer coil when a requested total output power on the third heating area is more than a maximum output power of the inner coil and when at least one of the first heating area or the second heating area is active, in order to reduce noise between the third heating area and the first and second heating areas, and manages the first power circuitry to supply power to the inner coil and the second power circuitry to supply power to the outer coil when the first heating area and the second heating area are inactive.

16. The induction heating device of claim 15, wherein the controller is further configured to manage the second power circuitry to not supply power to the outer coil when the requested total output power on the third heating area is less than or equal to the maximum potential output power of the inner coil.

17. The induction heating device of claim 15, wherein when the user instructs to concurrently activate both the first heating area and the second heating area, the controller manages the first power circuitry and the second power circuitry such that an absolute value of a difference between a resonance frequency of the first working coil and a resonance frequency of the second working coil is outside of a reference range of values.

18. The induction heating device of claim 15, wherein, when the third heat area is to be active concurrently with at least one of the first heating area or the second heating area, the controller further manages the first power circuitry and the second power circuitry such that an absolute value of a difference between a resonance frequency of an active one of the first working coil or the second working coil and a resonance frequency of the inner coil is outside of a reference range of values.

19. The induction heating device of claim 15, further comprising:

a fourth working coil corresponding to a fourth heating area; and a third power circuitry to selectively supply power to drive the fourth working coil, wherein, when the user instructs to concurrently activate the third heating area and the fourth heating area, the controller further:

manages the third power circuitry to supply power to the fourth coil to activate the fourth heating area, and manages the first power circuitry to supply power to the inner coil and the second power circuitry to not supply power to the outer coil to activate the third heating area.

* * * * *